(12) United States Patent
Barnett et al.

(10) Patent No.: US 7,940,370 B2
(45) Date of Patent: May 10, 2011

(54) INTERACTIVE ZOETROPE ROTOMATION

(75) Inventors: David F. Barnett, Simi Valley, CA (US); Lanny S. Smoot, Thousand Oaks, CA (US); Todd P. Camill, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 347 days.

(21) Appl. No.: 12/202,667

(22) Filed: Sep. 2, 2008

(65) Prior Publication Data

US 2010/0053557 A1   Mar. 4, 2010

(51) Int. Cl.
G03B 25/00   (2006.01)

(52) U.S. Cl. .......................... 352/87; 352/101; 352/102

(58) Field of Classification Search .................... 352/43, 352/86, 87, 101, 102; 40/411
See application file for complete search history.

(56) References Cited

U.S. PATENT DOCUMENTS

| | | | |
|---|---|---|---|
| 64,117 A | 4/1867 | Lincoln | |
| 2,913,954 A | 11/1959 | Morgan | |
| 3,951,529 A | 4/1976 | Gandia | |
| 4,104,625 A * | 8/1978 | Bristow et al. | 353/30 |
| 5,548,274 A | 8/1996 | Anderson et al. | |
| 5,870,170 A | 2/1999 | Pope | |
| 6,012,815 A * | 1/2000 | Bruinsma et al. | 353/10 |
| 6,097,468 A | 8/2000 | Muehlenhard | |
| 6,286,873 B1 | 9/2001 | Seder | |
| 6,353,468 B1 | 3/2002 | Howard et al. | |
| 6,575,260 B2 | 6/2003 | Bourget | |
| 2001/0013850 A1 | 8/2001 | Sakaguchi et al. | |
| 2003/0048417 A1 | 3/2003 | Rudnick | |
| 2004/0047617 A1 | 3/2004 | Matos | |
| 2004/0130905 A1 | 7/2004 | Olds et al. | |
| 2004/0136293 A1 | 7/2004 | Matos | |
| 2005/0213041 A1 | 9/2005 | Schmelzer | |

FOREIGN PATENT DOCUMENTS

| | | |
|---|---|---|
| GB | 339446 | 12/1930 |
| GB | 470541 | 8/1937 |
| GB | 2248959 A | 4/1992 |
| GB | 2307561 A | 5/1997 |

OTHER PUBLICATIONS

Smith, Roberta, "It's a Pixar World. We're Just Living in It" The New York Times, 2005, http://www.nytimes.com/2005/12/16/arts/design/16pixa.html?pagewanted=print, retrieved Mar. 10, 2008.

(Continued)

*Primary Examiner* — William C Dowling
(74) *Attorney, Agent, or Firm* — Marsh Fischmann & Breyfogle LLP; Kent A. Lembke; Bobby Soltani

(57) ABSTRACT

A 3D zoetrope that allows for storytelling and user interaction. The zoetrope includes an object support such as a disk that supports a plurality of objects. In one embodiment, the object support mechanism rotates the plurality of objects at a predetermined speed. The objects are illuminated and obscured by an illumination source in such manner as to make the objects appear to be animated in an interactive manner based on user input such as voice input. For example, the zoetrope may include an input interface for receiving external signals that may affect the operation of the animation sequence. The external signals may include audio, video, digital, or analog signals.

25 Claims, 8 Drawing Sheets

OTHER PUBLICATIONS

Zoetrope, From Wikipedia, the free encyclopedia, http://en.wikipedia.org/wiki/Zoetrope; retrieved Mar. 10, 2008. Mova and Gentle Giant Studios Show First-Ever Moving 3-D Sculpture of Live-Action Performance, 3-D-Zoetrope on Display at Siggraph 2007 Brings to Life Physical Sculpture of Speaking Face, Mova, Contour and Gentle Giant Studios, Aug. 6, 2007, San Diego, Siggraph.

Dickson, Stewart, 3-D Zoetrope, 2000.

Hu, Gigi, "The 7th Hiroshima International Animation Festival" Aug. 20-24, 1998, Animation World Magazine, Issue 3.7, Oct. 1998.

Rovner, Stephen, Sculpture (Including Zoetropes) 2003.

\* cited by examiner

INTERACTIVE ZOETROPE ROTOMATION

BACKGROUND OF THE INVENTION

1. Field of the Invention

The present invention relates, in general, to visual display assemblies and methods for creating 3D animated imagery with selective illumination of rotating objects, and, more particularly, to methods and systems for providing an improved zoetrope-based visual effect that provides viewer interaction or that reacts to input from an operator or observer.

2. Relevant Background

Devices for animating sequences of inanimate objects have existed for more than a century. One such device is referred to as a zoetrope, which is generally a device that produces an illusion of animation from a rapid succession of static images or objects. One type of zoetrope includes a vertically positioned cylindrical wall that is perforated by a series of vertical viewing slits that are regularly spaced around its circumference. The interior of the wall provides a surface to support a series of individual images, each comprising an incremental position in the path of movement of a depicted object. When the zoetrope is rotated around the axis passing through its geometric center and running parallel to the viewing slits, the interior surface of the wall may be alternately viewed through the slits and then obscured by the area of the wall between the slits. When viewed through the moving series of viewing slits, each successive image of the moving series supported on the interior surface of the wall is revealed as it reaches the same location where the image preceding it had been revealed.

When the zoetrope is rotated at a sufficient speed, the individual images are revealed for a brief enough period of time that the actual motion of the series is imperceptible, and then obscured for a brief enough period of time so that each image persists in the vision of the viewer until replaced by the image following it in the series. Thus, the zoetrope utilizes a stroboscopic effect to make possible the experience of animation.

Another type of zoetrope achieves a similar effect by using a strobed light source to rapidly illuminate and obscure pictures or three-dimensional (3D) characters that are rotated around a central axis. In one example, a plurality of 3D characters is positioned in concentric rings on the top surface of a circular platform. Typically, each successive character in a ring is the same character but with a slightly altered "pose." When the platform is rotated about its central axis at a sufficient speed, a single light source is rapidly flashed at a rate that causes the rigid 3D characters to appear as if they are animated. Typically, the strobe light used in 3D zoetropes illuminates the entire platform so that all the characters are animated simultaneously. While the characters appear animated because of the rotation, all of the animation for every ring of characters is repeated over and over and the display is always the same. Hence, while zoetropes have been effective in creating appealing and fascinating 3D visual effects, zoetropes have only been useful for showing a very short, scripted form of action (e.g., a single set of characters that appear due to sequential lighting or viewing). As a result, the uses of zoetropes are limited to displays viewed briefly by visitors who may quickly lose interest or become bored.

SUMMARY OF THE INVENTION

The present invention addresses the above problems by providing interactive zoetrope systems and methods adapted for selectively illuminating rotating objects based on input to provide a visual display that varies with or is created based on such input. In this manner, a user or observer may interact or play with a zoetrope for a much longer period of time and remain entertained (e.g., "The zoetrope is reacting to me and the input I provide!"). The input typically is audio input such as a recorded song that causes select objects to be illuminated or, in some preferred embodiments, the audio input is captured in real time from observers of the zoetrope system such that the zoetrope-based display is unique to the observers viewing and interacting with the display. For example, a child may approach an operating zoetrope system of the invention and when they speak, a face may be lit in a pattern based on their vocal pattern that causes the face to appear to be speaking with the child and saying the same words and at the same volume (e.g., mouth open more when speaking loudly, mouth open less when speaking softly, and mouth closed when not speaking). The zoetrope system may be a relatively large display such as at a theme park, a theatre, a mall, or the like or be much smaller such as a zoetrope-based video game or display sold to individuals as a retail product.

Briefly, to achieve such an effect, a zoetrope system may include a platform or base rotated on a shaft of a motor. A shaft encoder (analog or digital) or other device may be provided on the motor or shaft to provide an output signal or data representative of the location of the shaft and, hence, the rotating platform at any particular point in time. In one embodiment, a set of objects is mounted at a particular radius (or sets at varying radii) on the base or platform, and the objects within a set typically differ such that their selective illumination creates a desired effect such as to represent a face that is speaking or singing, which can be achieved with 2 to 7 or more differing objects (e.g., faces or heads with at least the mouth in a range of positions between closed and fully open). The zoetrope system further includes an audio input device(s) such as a microphone or the like and a controller or control system/component that uses comparators and/or volume meter chips/devices to determine a magnitude or level of an input audio signal from the audio input device and trigger a light source to illuminate a particular one of the objects that is associated with that audio input magnitude or level, with the location of the object known based on output of the shaft encoder. For example, a volume meter chip may output an electrical signal indicative of how loud a zoetrope viewer is speaking into a microphone (e.g., at varying levels the meter chip output is used to steer a short pulse of electricity to light a selected object), and a set of comparators may be used to trigger on differing points of a ramp so that a selectable trigger pulse is generated as a particular zoetrope object is rotated by or positioned adjacent a light source.

In one embodiment, the controller or controller system is configured to strobe or pulse the light source such that one of the zoetrope objects is illuminated about 20 to 30 times or more per second (e.g., frames per second for animation effects), and, to this end, the strobe or pulse of light may be in the range of about 200 to 300 microseconds in duration (e.g., pulse width selected to be short enough to freeze the illuminated zoetrope object but not to allow it to appear to smear or streak (unless that effect is desired for a particular implementation)). Note, in some embodiments, the pulse width is kept constant while in other embodiments the pulse width is adjusted (or adjustable) by the controller or control system to achieve a desired effect or to allow an operator to tune operations to create a desired 3D animation effect (e.g., adjust pulse width to better suit the revolution rate or speed of the platform and the platform's size to achieve a more crisp or clean image or to purposely achieve flicker, smearing, or the like). Generally, the platform or base is rotated about 15 to 20 revolutions per second (RPS) such as for smaller platforms of less than about 3 feet in diameter or the like (note, the platform or base does not have to be circular to practice the invention with other shapes used in some cases such as hexagonal or other polygonal or even irregular shapes). When larger platforms are used, the rotation rate may not be adequate to obtain a desired illumination rate of 20 to 30 times per second or more. In such cases, the sets of characters or zoetrope objects may be repeated to provide 2, 3, or more sets of the same objects (e.g., repeat a set of faces in varying stages of speech) to achieve the desired illumination or frame rate. In all embodiments, the controller or control system is adapted to know where each of the characters are relative to the light source (or to know where the motor shaft is in its rotation cycle) or to know what "frame" or "object configuration" is opposite the light source provided for that set of zoetrope objects.

The light source is selected and arranged to provide a pinpoint, a spot, or accurate focusing of its output light onto a particular location of the zoetrope system, and the zoetrope objects are rotated through this location or focal point/area of the light source. In some cases, more than one light source is utilized such as when the zoetrope system provides more than one viewer interaction/viewing station about the periphery of the zoetrope base/platform (e.g., more than one controller or controller subsystem may be provided to allow the same set of zoetrope objects to be used to operate in response to or interactively based on audio input from more than one viewer or user in a concurrent manner). In other cases, 2 or more sets of zoetrope objects may be arranged at 2 or more radii from the center of the base or platform and these differing sets of zoetrope objects may be illuminated by differing light sources to achieve a desired effect.

DETAILED DESCRIPTION

Figure 1:
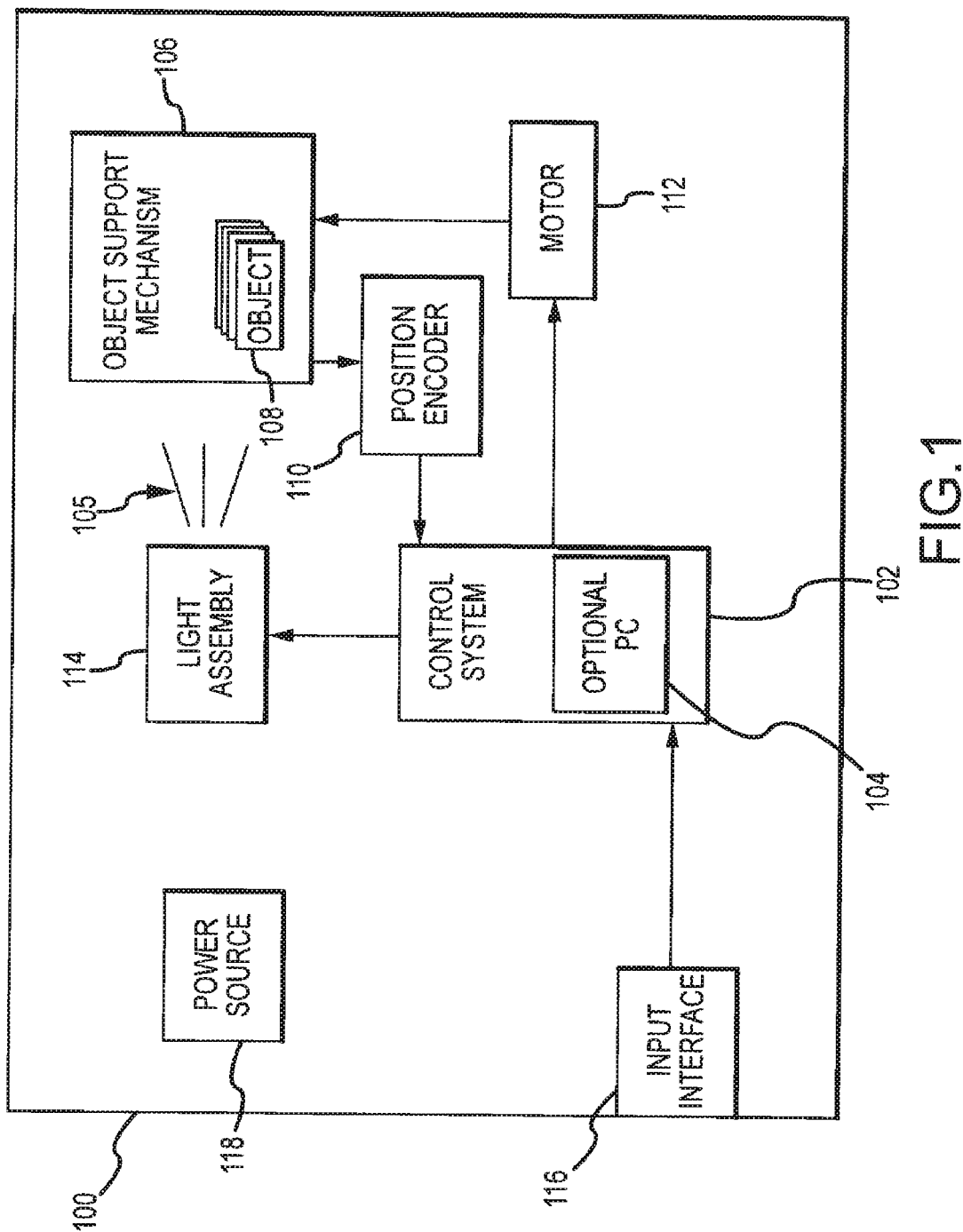
FIG. 1 illustrates a block diagram of an exemplary interactive zoetrope.

Referring to FIG. 1, a block diagram of an interactive zoetrope or zoetrope system 100 is shown that provides viewers with a 3D visualization of one or more objects and may include features that allow storytelling, gaming, and other interaction with viewers. The zoetrope 100 includes an object support mechanism (OSM) 106 (e.g., a disk or platter) that supports a plurality of 3D objects 108 such as figurines or characters. A motor 112 is coupled to the OSM 106 and is operable to cause the OSM 106 to rotate at one or more velocities, which may be predetermined and/or adjustable during operations of zoetrope 100. The motor 112 may be controlled by a control system 102, which receives real-time position and/or velocity information about the OSM 106 from a position encoder 110 and, in some embodiments, uses the information to cause the motor 112 to adjust the rotational speed of the OSM 106. The control system 102 may further control a light assembly 114 that is positioned so that it may illuminate one or more objects 108 on the OSM 106 in such a manner that the objects are quickly illuminated and obscured as they rotate on the OSM 106 so that they appear to move or be animated (i.e., rotomation). The light assembly 114 may include one or more individual light sources that may be strobed or pulsed for short durations (e.g., 200 to 300 microsecond pulses or the like). The zoetrope 100 may also include an input interface 116 that is coupled to the control system 102. As discussed in more detail below, the input interface 116 may be operable to receive external signals (e.g., audio, video, control, or the like) from operators and/or viewers/users of the zoetrope that are used by the control system 102 to modify the operation of the zoetrope 100. Further, to provide power to the various components of the zoetrope 100, a power source 118 may be included. The power source 118 may include batteries, power supplies, power conditioners, and/or other components typically used to provide power to electronic devices.

The control system 102 may be a combination of hardware and software that is operable to perform the control functions for the zoetrope 100. For example, the control system 102 may include a processor, memory, I/O ports, displays, or the like. As shown, the control system 102 may include an optional personal computer (PC) 104 that may provide additional features such as allowing updating of software, adding new features, or the like.

The OSM 106 may support the plurality of objects 108 that are spaced apart in predetermined positions typically in concentric circles or rings a set radius from a rotation or central axis of the support mechanism 106. The control system 102 may then cause the motor 112 to rotate the OSM 106 at a predetermined velocity (e.g., 20 to 30 rotations per second (RPS) or more or less in cases of repeated characters/objects to achieve a desired frame rate). As the OSM 106 is spinning, the control system 102 may cause the light assembly 114 to selectively illuminate and then obscure (e.g., objects are typically not visible when they are not illuminated) one or more objects 108 on the OSM 106 in such a manner that it appears to a viewer that the objects 108 are animated or are moving/changing position. As discussed above, this may be achieved by using temporal aliasing (also known as "stroboscopic effect"). As an example, if the OSM 116 is rotating at a constant rate, then the objects 108 may appear to be stationary if the light assembly 114 flashes light 105 on the objects 108 at the same rate (which may be used by the control system 102 when the audio or other input from input interface 116 is substantially constant or within a preset range associated with a particular one of the characters or objects 108 such as for keeping a mouth closed when no input is received or wide open when a high audio level is received over a period of time and so on). If the flashing rate of the light assembly 114 (or the speed of the rotating OSM 116) is slightly adjusted, the objects 108 may appear in different locations during each revolution or differing ones of the objects 108 may be illuminated in successive sets of revolutions (e.g., illuminate one object 108 and then another one of the objects 108), which will create the illusion that the objects 108 are moving or are animated. It should be appreciated that the timing of the flashes of light 105 and the rotational speed of the OSM 106 may be dynamically and interactively adjusted to create desirable effects, as discussed in the examples provided below.

The input interface 116 may be used by the control system 102 to permit a user to interactively control the animation of the objects 108 of the interactive zoetrope 100. For example, the input interface 116 may include one or more buttons, a video game controller/pad, a touch screen, or the like that permit a user to change the animation sequence or play a game with the control system 102 operating the light assembly 114 to illuminate objects 108 responsive to the input from the user. As another example, the input interface 116 may be operable to sense movements of a user and the movements may be translated by the control system 102 into changes in the animation (e.g., a character's hands move in the same way as a user's hands). In the example discussed below in relation to FIGS. 2 and 3, the animation sequence of the objects 108 are controlled to correspond to characteristics of a user's voice or based on audio input. Those skilled in the art will readily recognize that the input interface 116 may be operable to receive other forms of external signals to enable the zoetrope 100 to be interactive and is not limited to audio interactivity.

Figure 2:
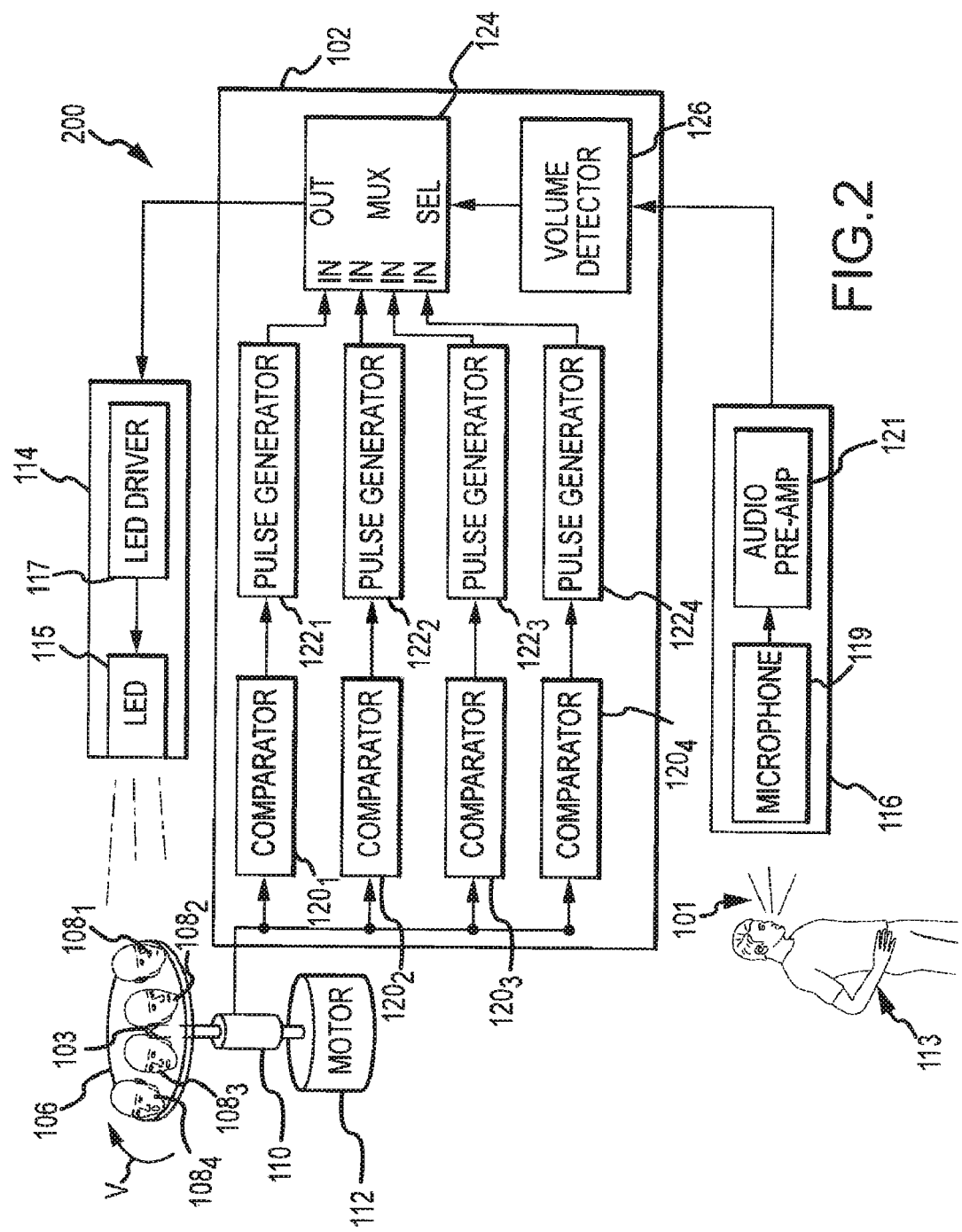
FIG. 2 illustrates an audio-controlled interactive zoetrope.

FIGS. 2 and 3 illustrate an exemplary interactive zoetrope or zoetrope system 200. Components that are similar to those shown in FIG. 1 are identified with the same reference numerals. As shown in FIG. 2, the zoetrope 200 includes a disk 106 that supports a plurality of 3D character faces $108_{1-4}$. Each of the faces $108_{1-4}$ corresponds to a person speaking at progressively louder volumes, with $108_1$ representing a person that is not speaking or is whispering, and $108_4$ representing a person that is speaking loudly. The disk 106 is coupled to a shaft 103 that is in turn coupled to a motor 112 that is operable to spin the disk 106 at a predetermined velocity (V) (e.g., about 20 to 30 RPS or more).

To selectively illuminate the faces 108, a light assembly 114 is included and is positioned proximate to the disk 106. The light assembly 114 may include a LED driver 117 that drives an LED 115. As discussed above, the LED 115 may be flashed at a rate and duration such that one face 108 is illuminated each revolution of the disk 106. In other words, a single face 108 may appear stationary to a person viewing the zoetrope 200 while the others are obscured or not illuminated (e.g., LED 115 strobed to illuminate $108_1$ for a number of revolutions while a viewer/user 113 is not talking or providing audio input 101). Generally, the zoetrope 200 operates to create an illusion of a single face 108 that is animated in real-time at a viewing station (e.g., one of the objects 108 is illuminated each revolution of the disk 106 at a particular location such as adjacent or opposite the LED 115 or in the focal zone or area of the LED 115) to correspond to the volume of a person's 113 voice 101 that is spoken into an input interface 116. For example, when a person is speaking loudly into a microphone 119 of the input interface 116, the zoetrope 200 illuminates only the face $108_4$, which is the character that has a facial expression of a person speaking loudly. The details of the operation of the zoetrope 200 are discussed below.

In one embodiment, a position encoder 110 (e.g., an analog shaft encoder while other embodiments may use digital encoders) is coupled to the shaft 103. The position encoder 110 is operable to output an analog ramp signal that correlates to the rotational position of the shaft 103 (and, therefore, the position of the disk 106). For example, the position encoder 110 may output a minimum voltage when the disk 106 is at a first position and a maximum voltage when the disk 106 is rotated about 359 degrees from the first position. This ramp signal from the position encoder 110 is then fed to a bank of four comparators $120_{1-4}$ inside or part of the control system 102. The four comparators $120_{1-4}$ are each configured to output a signal when the respective faces $108_{1-4}$ are aligned with the LED 115. For example, the comparator $120_1$ is configured to output a signal when the position encoder 110 outputs a voltage that corresponds to the position of the disk 106 when the face $108_1$ is directly in front of the LED 115. As can be appreciated, each of the comparators $120_{1-4}$ will send an output signal once per revolution of the disk 106.

Each of the outputs signals from the comparators $120_{1-4}$ is sent to respective pulse generators $122_{1-4}$, which are operable to receive an output signal from the comparators $120_{1-4}$ and immediately output a pulse signal of a predetermined duration. The duration of the pulse may be selected to be sufficiently short such that the faces $108_{1-4}$ do not appear to move during the time that they are illuminated (e.g., 0.2-0.3 millisecond pulse widths). In this regard, each of the pulse generators $122_{1-4}$ outputs a pulse signal once per revolution of the disk 106 during the time when a corresponding face $108_{1-4}$ is positioned in front of the LED 115. The outputs of the pulse generators $122_{1-4}$ are then fed into the inputs of a multiplexer 124, which is operable to select one of the pulses from the pulse generators $122_{1-4}$ and output the selected pulse to the light assembly 114. The LED driver 117 of the light assembly 114 then powers the LED 115 when it receives a pulse from the multiplexer 124.

The zoetrope 200 may further include speech recognition features that enable a larger number of characters to simulate the speech of a user talking or singing into the input interface 116. For example, a large number of faces (e.g., 15, 30, or more faces) may be provided that represents a large range of facial expressions and emotions. Through the use of audio or video recognition, the zoetrope 200 may be operable to select and display a face that most closely represents the facial expression or emotion of a viewer in real time. The audio or visual recognition may be provided through software, hardware, or a combination thereof. For example, if the zoetrope 200 incorporates speech recognition, software may be operable to recognize the spoken words of a viewer, and to select a series of faces that, when viewed in succession, gives the appearance that the face is speaking those same words in real time.

In order to determine which of the faces $108_{1-4}$ should be illuminated at a given time, the multiplexer 124 is coupled to the input interface 116 through a volume detector 126. In operation, the user 113 speaks and provides audio input or an acoustic signal 101 to a microphone 119 of the input interface 116. Next, the signal from the microphone 119 may be amplified by an audio pre-amplifier 121 and fed into the volume detector 126. The volume detector 126 is operable to receive the audio signal and output a digital signal that corresponds to the volume of the audio signal. For example, the volume detector 126 may output a binary 0 if the volume of the signal is very low, corresponding to a person whispering (e.g., 20-40 dB), and a binary 3 if the volume of the signal is very high, corresponding to a person shouting (e.g., 80-100 dB). It should be appreciated that other analog and digital techniques may be used to detect the volume of a user's voice (or magnitude or level of audio input 101). The multiplexer 124 then outputs a pulse to the light assembly 114 that corresponds to the face $108_{1-4}$ that is selected by the volume detector 126 as an approximation of the user's voice. In this manner, the zoetrope 200 is adapted to be interactive and, in response to audio input 101, to operate to illuminate one of the objects 108 during each revolution of disk 106 such that the user or viewer 113 is in effect controlling or creating the display or visual effect with their input 101. In other words, the zoetrope 200 operates responsively to audio input 101 to create a 3D animated display that is not predefined or scripted but instead varies over time and in real time based on user input and interaction.

Figure 3A:
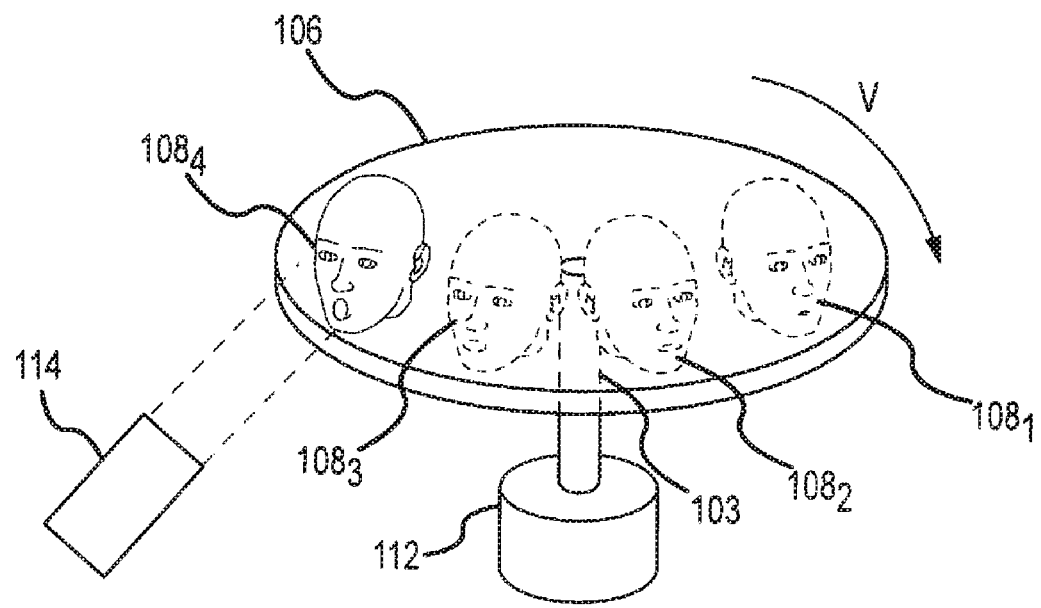
FIGS. 3A-3B illustrate the operation of the zoetrope shown in FIG. 2.
Figure 3B:
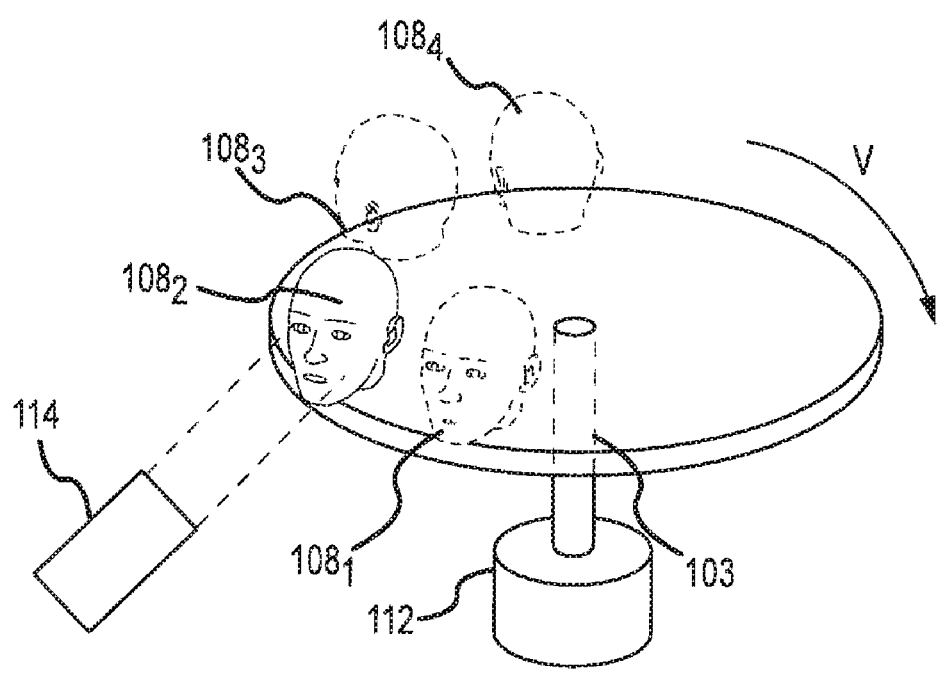

FIGS. 3A-3B illustrate the operation of the zoetrope 200 when the user 113 is speaking loudly (FIG. 3A) and softly (FIG. 3B). As shown in FIG. 3A, the light assembly 114 is controlled to flash a pulse of light each time the face $108_4$ passes in front of it as the disk 106 is spinning As indicated by the dashed lines, the other faces $108_{1-3}$ are not illuminated and therefore are not viewable by the user 113 when the disk 106 is spinning. FIG. 3B shows the same effect but at a time when the user 113 is speaking at a lower volume than the example shown in FIG. 3A. In this regard, the face $108_2$, rather than the face $108_4$, is illuminated each revolution by the light assembly 114. It should be appreciated that because the disk 106 may be rotating rapidly (e.g., velocity, V, up to about 35 RPS or faster), it is possible for the zoetrope 200 to react quickly to changes in volume of the user's voice, so that it appears to the user 113 that the faces $108_{1-4}$ are tracking the volume of the user's voice in real-time. Further, as discussed below, the zoetrope 200 may be configured to detect other characteristics of a user's voice and translate those characteristics into movements by the characters.

It should be noted, that multiple light assemblies 114 may illuminate the face of a single character, thus it is possible to use one assembly to light the eye-height area of a character, one assembly to light the nose-height area, and finally a third assembly 114 could light the mouth-height area. In this manner, portions of a face can be "swapped" for other portions (e.g. raised eyebrows can be substituted for lowered eyebrows, while keeping the same mouth position).

Additionally by slightly varying the timing (phases) of illumination signals to the high, low, and middle lighting assemblies 114, a singe character could be made to appear to separate along horizontal cleaving planes, and to waver left and right in a resemblance of a "Star Trek" transporter effect.

In a related embodiment, lighting assembly 114 may be handheld. In this case, a user may move the stroboscopic lighting around to discover the current position of an object on the platter (all objects not specifically lit will appear to be invisible).

Additionally, a shooting type game may be realized wherein users are given strobed "guns" that fire bursts of collimated light. If these bursts are determined to have hit a character (for example, through the use of a photo sensor timed to only receive light scattered from a particular character at a particular position and only at the time when the user "fires" his gun), then, that character may be instantaneously swapped (by a change in timing of the light assembly) with a similar character which shows damage due to the hit.

The zoetrope 200 may implement the aforementioned features using any combination of hardware and/or software. For example, rather than using comparators, pulse generators, and multiplexers, a microprocessor may be used to perform the functions of the control system 102. In this regard a digital shaft encoder may be provided that outputs a digital signal that represents the instantaneous position of the shaft 103 (and therefore the disk 106), which may be used by the microprocessor to control the operation of the light assembly 114. Those skilled in the art should readily recognize that there may be various ways to implement the features of the zoetrope 200.

Figure 4:
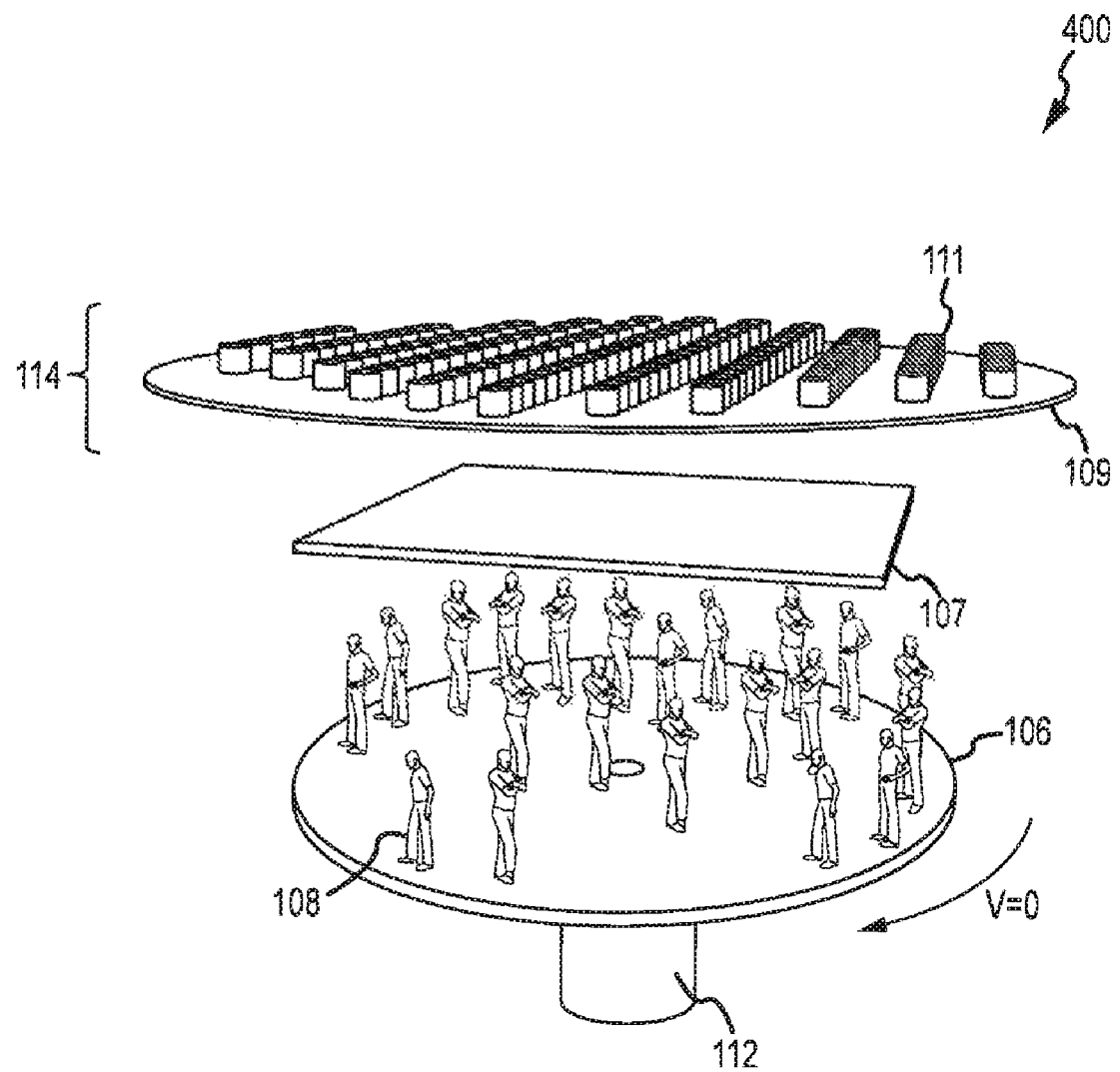
FIG. 4 illustrates another exemplary interactive zoetrope.

FIG. 4 illustrates another interactive zoetrope 400 that includes a motor 112 that is operable to rotate a disk 106 that supports a plurality of characters 108. In this embodiment, the light assembly 114 includes an array of independent LEDs or other lights 111 that are positioned on a glass shelf 109 that is mounted over the characters 108. The light assembly 114 may be operable to independently control the timing, phase, color, and pulse duration of each individual LED 111. Further, the zoetrope 400 may include a lens 107 (e.g., a Fresnel lens or the like) to focus light from the LEDs 111 on one or more characters 108. Although the light assembly 114 is shown mounted above the characters 108, it should be appreciated that the light assembly 114 may be positioned in other locations (e.g., below the disk 106, with lights 111 positioned inside the individual characters 108, or the like).

By using an array of light sources, rather than a single light source, a number of features may be implemented. For example, one or more characters 108 may be illuminated individually, while others are kept in darkness. This feature permits the zoetrope 400 to display animations that are much more complex than previously known zoetropes. For example, the animation sequence may last longer (e.g., multiple revolutions) than a single revolution, which allows for interactive storytelling or gaming. Further, previously unseen characters 108 may appear after a time has passed in the animation sequence. Additionally, characters 108 may be "reused" in other positions (e.g., provide objects of a single character or pose at differing radii) such that a single character 108 may represent multiple roles. These and additional features are further discussed in the examples provided below.

Figure 5A:
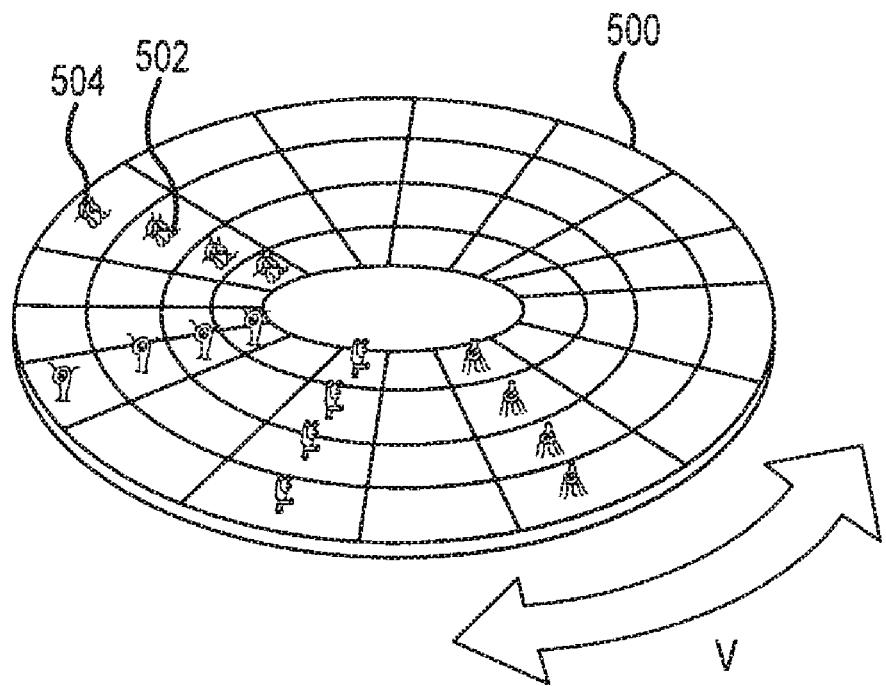
FIGS. 5A-5B illustrate a game that utilizes an interactive zoetrope.
Figure 5B:
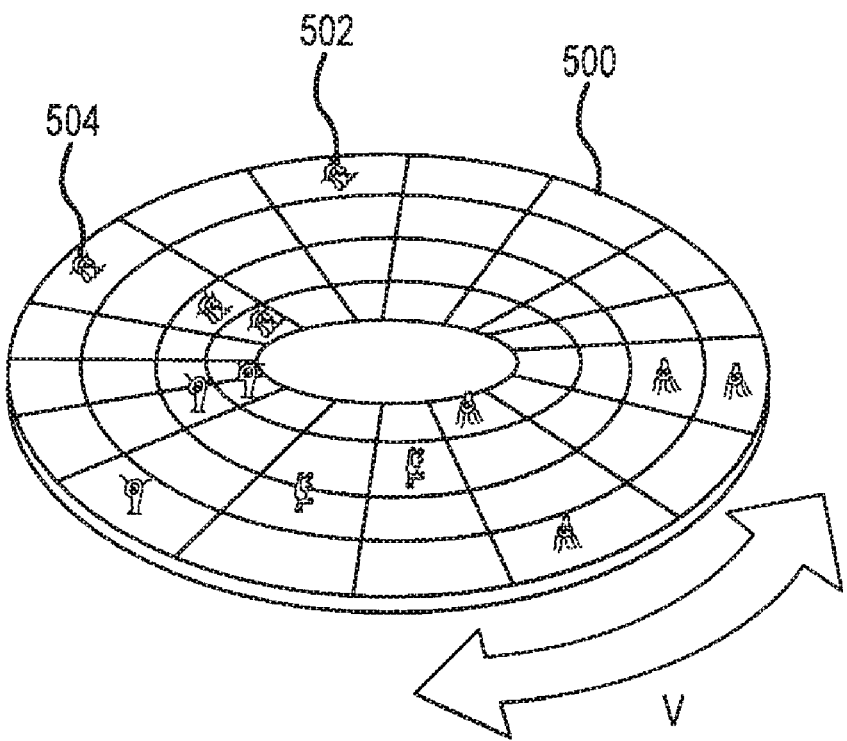

FIGS. 5A-5B illustrate a game that utilizes the features of the zoetrope 400 to selectively light characters on a disk 500 (e.g., one, two, or more (and even all) of the characters/objects may be illuminated at any time). In this embodiment, a zoetrope system is provided with the disk 500 including a plurality of characters (e.g., characters 502 and 504). When the disk 500 is spinning at a velocity (V), the characters are illuminated by a light source by methods described above with reference at least to FIG. 4 to provide the illusion that the characters are stationary on top of the disk 500. In operation, game players may input various "moves" into a control system of the zoetrope, which causes the illusion that the characters (e.g., characters 502 and 504) are moved on the playing surface 500. In this regard, a game may be played by "moving" the characters according to the rules of a specific game (e.g., chess, checkers, ping pong, or the like). For example, two or more players may each be provided with an input device (e.g., a keypad, joystick, touch screen, or the like) that allows them to selectively choose the position of one or more characters that reside on the playing surface 500.

In the illustration provided in FIGS. 5A and 5B, the characters (e.g., characters 502 and 504) may appear to be stationary at all times except when a player instructs the system to move a character from one position to another position on the playing surface 500. In response to a player instruction, the control system of the interactive zoetrope may cause the character to "instantaneously" transport to a new position on the player surface 500. Alternatively, the control system may cause an illusion that the character is slowly moving from one position to the next in an animated fashion (e.g., walking from one position to another, hopping, etc. . . . ). Further, the zoetrope may add and remove characters from the playing surface according to actions made by the players. As an example, when the zoetrope is used to implement a chess game, the zoetrope may remove a character (e.g., a pawn) when one player "captures" it.

The techniques used by the zoetrope 400 may also be used to implement a game that requires more interaction than the board game illustrated in FIGS. 5A and 5B. For example, in one embodiment the zoetrope is configured to allow multiple players to play a game of ping-pong with each other. Players may be provided with a game controller that permits them to individually control a character of the zoetrope in real time. In operation, the control system of the zoetrope receives input from each game controller (e.g., character movements, swinging a paddle, or the like) and uses the inputs to cause an animation of the fixed characters and ping pong balls that appears to viewers to be 3D characters playing a game of ping-pong. The zoetrope may reuse individual characters as they spin around the disk so that one character may represent more than one animated "ping-pong player." Further, the zoetrope may illuminate the different characters using different colors of lights to allow players to distinguish one animated character from another.

Figure 6A:
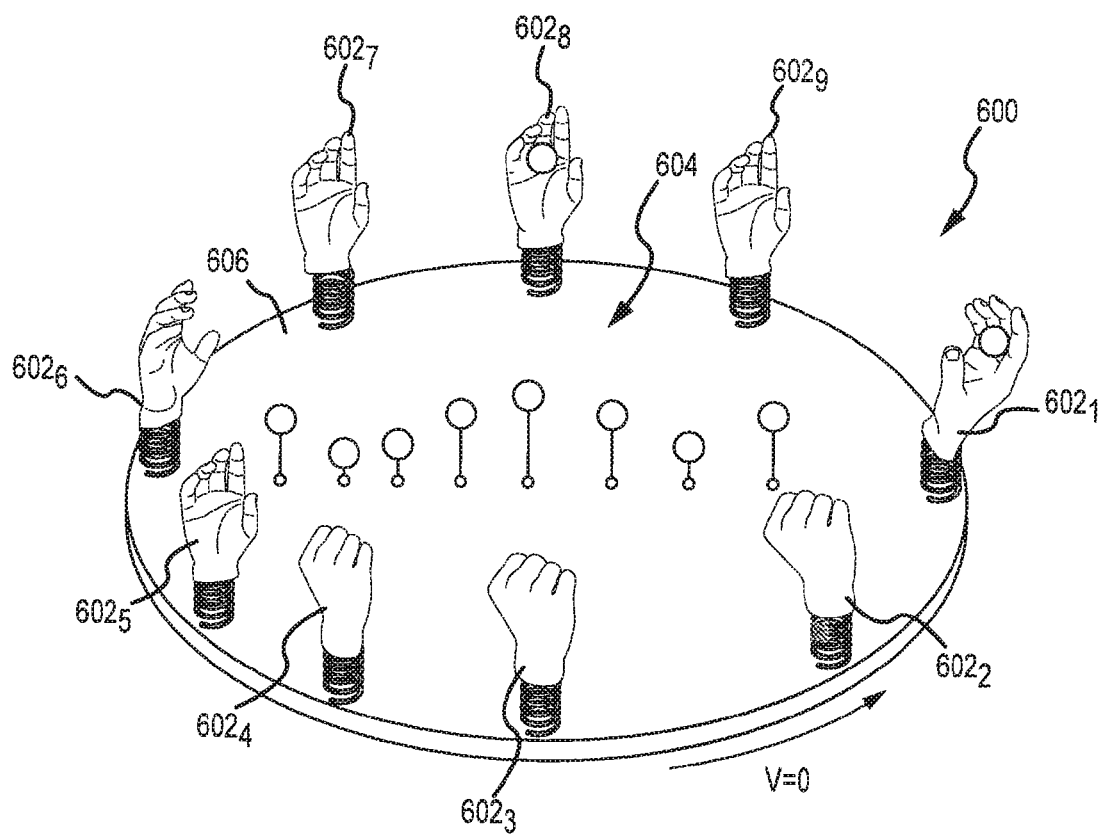
FIGS. 6A-6B illustrate another exemplary interactive zoetrope.
Figure 6B:
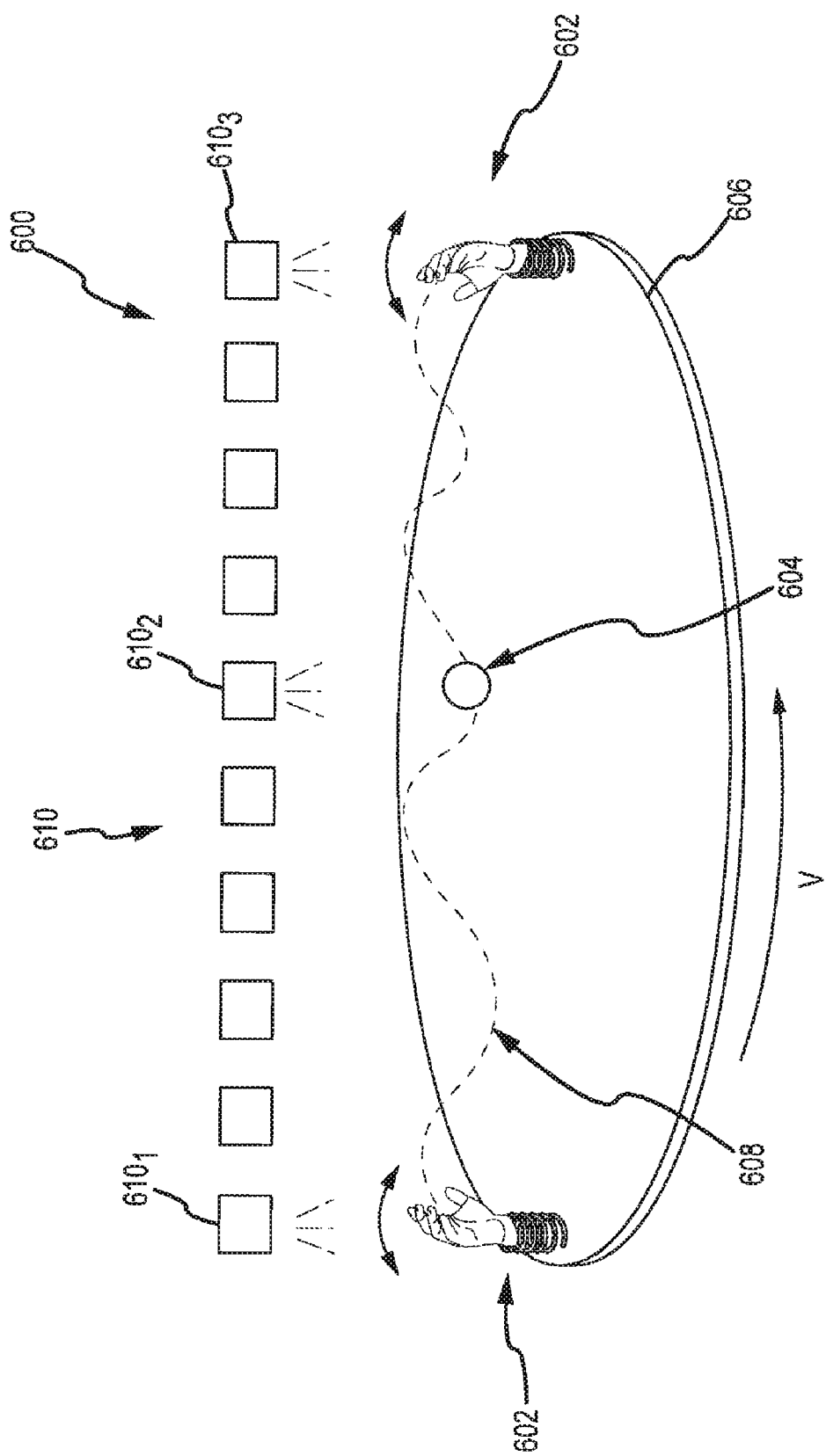

FIGS. 6A-6B show another embodiment of an interactive zoetrope 600. FIG. 6A illustrates the zoetrope 600 when it is not rotating while FIG. 6B illustrates the zoetrope 600 when it is spinning at a velocity (V) (e.g., 20 to 30 RPS). In operation, the zoetrope 600 provides the illusion of two hands 602 throwing a ball 604 back and forth to each other from opposite ends of a disk 600. To achieve this illusion, a plurality of hand characters $602_{1-9}$ is positioned in a ring of a given radius from the rotation or central axis of the disk or platform 606 such as at the edge of the disk 606. Each of the hands $602_{1-9}$ is slightly different (e.g., placed in a differing pose or configuration) from the others and represents the motion that a hand makes when thawing and catching a ball 604. Further, the zoetrope 600 includes a plurality of balls 604 that are positioned along a line in the disk 600 at various heights along a "path" that the ball may appear to travel between the hands 602.

FIG. 6B illustrates a snapshot of the zoetrope 600 when it is spinning and providing the illusion. As shown, a light assembly 610 is positioned over the disk 606. The light assembly 610 includes a plurality of light sources (e.g., $610_{1-3}$) that are positioned to illuminate individual figures or objects (e.g., the hands $602_{1-9}$ and the ball 604). In this snapshot, the light sources $610_1$ and $610_3$ are illuminating the hands 602 at each end of the disk 606, while the light source $610_2$ is illuminating the ball 604 along its path indicated by the dashed lines. The arrows above each of the hands 602 indicate that the hands appear to be animated to a viewer. This is achieved by selectively controlling the timing of the light assembly 610 to illuminate different hands $602_{1-9}$ in such a manner as to cause the appearance of hands throwing the ball 604 back and forth across the disk 606.

The zoetrope 600 may be interactive, permitting a player to press a button to cause one hand 602 to throw the ball 604 to the other hand on the opposite side of the disk 606. Further, the zoetrope 600 may include multiple input interfaces that allow multiple players to interact with it. In one embodiment, multiple players can each control a hand 602 that appears to be stationary at one position of the disk 606 (e.g., one hand for each player spaced apart around the edge of the disk 606). The players may each be provided with a controller that permits them to control the "movement" of the hand, including throwing a ball to one of the other hands that is operated by a different player. In one embodiment, the zoetrope 600 may be used to provide a virtual game of "hot potato," where players each control a hand 602 to "throw" a ball around a circle while music is played, wherein the player whose hand is holding the ball when the music stops is out of the game (e.g., the zoetrope 600 remove the hand in that player's position by not illuminating it). Subsequent rounds of hot potato may be played until only one player is left. As in the examples provided above, it should be appreciated that the individual hands $602_{1-9}$ may be reused by the zoetrope 600 to create the illusion of multiple hands (e.g., one for each player) by individually illuminating the hands $602_{1-9}$ at each position where a player's hand is to be displayed. For example, at the beginning of the game, it may be desirable that the hands for all of the players to be in the same pose (e.g., the pose of the hand $602_6$). The zoetrope 600 may cause one hand (e.g., the hand $602_6$) to be illuminated when it passes by each position where each player's hand is to be displayed, providing the effect that there are multiple hands that are all in the same pose.

Although FIGS. 6A-6B illustrate a simple embodiment of an interactive zoetrope, many other variations are contemplated. In one embodiment, an interactive zoetrope is used to implement a multiple player hockey game. In this regard, multiple players are provided with game controllers that permit them to control one or more "hockey player" characters. The zoetrope may include a platform with a plurality of characters that resemble hockey players in various poses, as well as a plurality of hockey pucks disposed in various positions on the platform. In operation, the platform may be rotated at a velocity V (e.g., 20 to 30 RPS, or more) and the zoetrope uses the inputs received from the multiple players to selectively illuminate individual hockey player characters and individual hockey pucks to provide the illusion of a hockey game. To enable the reuse of characters for different hockey teams, the zoetrope may illuminate characters for each team with different colors (e.g., red team vs. blue team). It should be appreciated that other interactive animations may be implemented as well. For example, the techniques described herein may be used to provide a more complicated multi-player game such as boxing, tennis, baseball, or the like. Alternatively, the techniques may be used to illustrate an interactive story, whereby users can control the animations by inputting commands (e.g., using a keypad, touch screen, or the like) into the control system of the zoetrope.

In another example, a zoetrope may be operable to receive external audio and/or video signals and create the illusion of performers performing songs or actions that were input into the zoetrope. Such signals may be created in real-time by humans, or may be stored in various files (e.g., mp3, WAV, or the like). In one embodiment, a zoetrope includes figurines that represent characters in a musical band. The zoetrope is operable to receive music signals from an external source and create the illusion that the 3D figurines are performing the song being played. The external source may be devices that provide signals to the zoetrope in real-time, such as a microphone, a musical instrument, or a game controller that represents a musical instrument (e.g., drums, guitar, or the like). Further, the zoetrope may be configured to receive and playback prerecorded audio files. For example, the zoetrope may include storage (e.g., a disk drive, flash memory, or other storage device) for storing music files. Additionally or alternatively, the zoetrope may include an interface that permits users to provide prerecorded songs. As an example, the zoetrope may have an interface (e.g., USB, wireless, or other suitable interface) that permits users to couple a personal music player (e.g., an mp3 player) to it so that the songs may be played back and illustrated by animated characters.

The zoetropes described herein may include multiple viewing stations where multiple viewers may view the same or different animation sequences. In one embodiment, a single zoetrope has a plurality of viewing windows spaced apart along an outer edge. Each of the viewing windows may display separate interactive animations that are based on inputs received from viewers at each window. In this regard, the characters of the zoetrope may be reused for each viewing window to create individual interactive animation sequences, so that multiple users may simultaneously view and interact with the zoetrope.

The size of each individual zoetrope may vary considerably depending on the application for which it is intended. For example, a zoetrope that is to be used at a theme park may be several feet (e.g., 3 feet, 20 feet, or more) in diameter to permit viewing and interaction by multiple viewers. Alternatively, zoetropes that may be provided for individual entertainment may be much smaller, such that they may be placed on a table top, or hand held.

Figure 7:
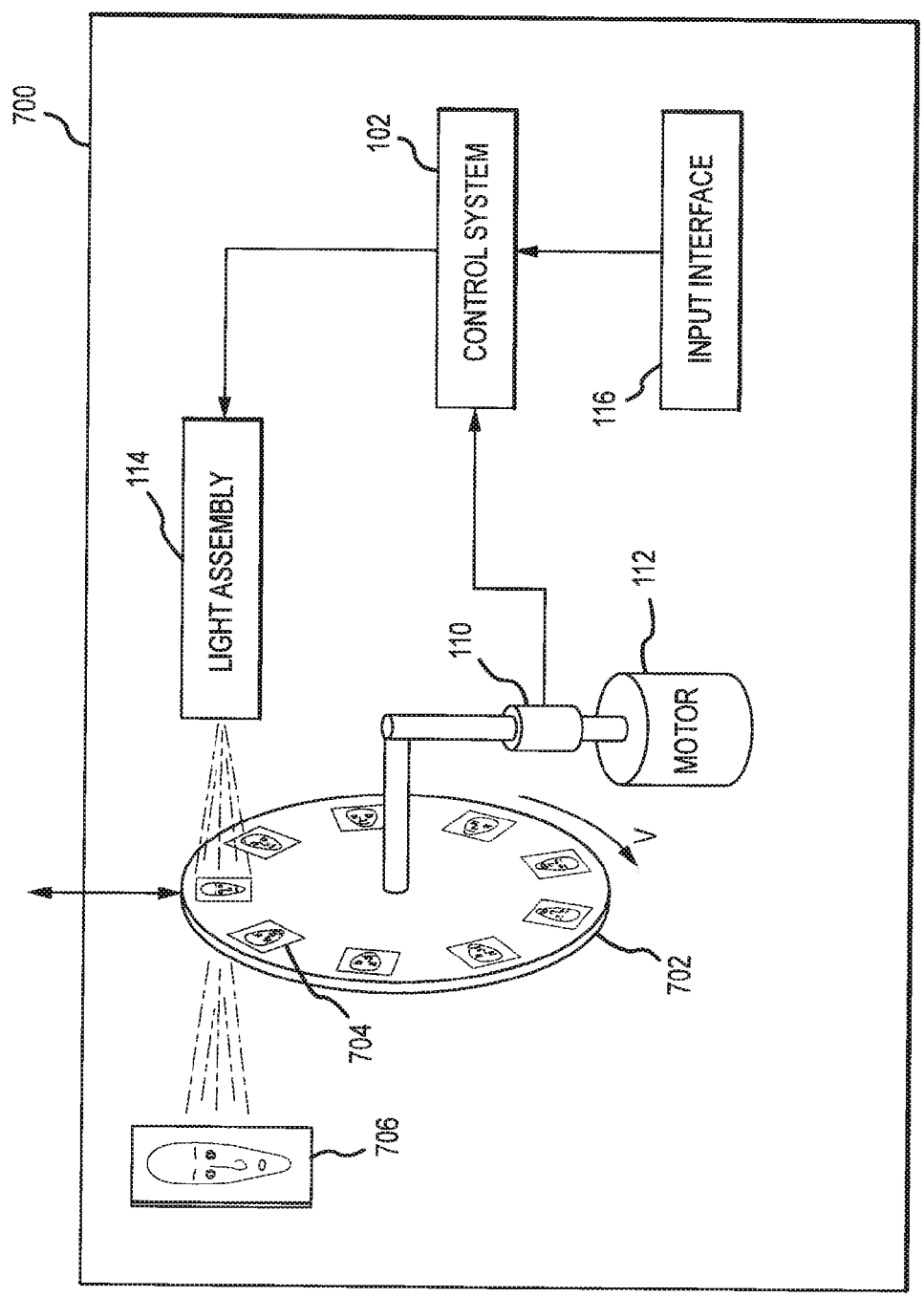
FIG. 7 illustrates another embodiment of an interactive zoetrope.

FIG. 7 illustrates another embodiment of an interactive zoetrope 700 wherein components that correspond to components shown in FIG. 2 are labeled with corresponding reference numerals. The zoetrope 700 may be included as part of a consumer device (e.g., a clock radio, a toy, or the like) or may be standalone. The zoetrope 700 includes a disk 702 that is coupled to the motor 112 and may rotate at a predetermined velocity V (e.g., 20 to 30 RPS, or more). The disk 702 includes a plurality of images 704 disposed on an at least partially light transmissive base (e.g., slides) that depict a series of faces with different facial expressions. In operation, the light assembly 114, which may include an output objective lens (not shown) to focus the light from light assembly 114 having passed through disk 702, is used to selectively illuminate one or more of the slides 704 during each revolution of the disk 702 in such a way that an animated image appears on a projection surface 706. Similar to previously described embodiments, the zoetrope 700 includes an input interface 116 that is operable to receive signals that may be input into the control system 102 to control the animation sequence. For example, the input interface may receive audio signals from a viewer, from an internal or external memory (e.g., a disk drive, CD, or the like), or from any other source (e.g., a broadcast radio station, a network, or the like).

Although the projection surface 706 is shown to be integrated into the zoetrope 700, it should be appreciated that the projection surface may be an external object, such as a wall, ceiling, screen, or the like. Additionally, one or more optical elements (e.g., lens, filters, or the like) may be included to achieve desirable projections. Further, in one embodiment, a projection surface is not included, and a viewer may directly view the animation by looking at the slides 704 as they are selectively illuminated by the light assembly 114. In this "direct view" embodiment, the light assembly 114 essentially functions as a backlight for the animations.

As shown by the arrow above the disk 702, the disk may be selectively removable from the zoetrope 700. This may be desirable to allow a viewer to change the animation that is displayed by the zoetrope 700. For example, a plurality of disks 702 that include slides that each show different characters may be used with the zoetrope. Further, the input interface 116 may be configured to receive signals that uniquely correspond to different disks 702. For example, a viewer may insert a disk 702 that has a plurality of images of a character making various facial expressions. The zoetrope 700 may be adapted to identify a characteristic of the unique disk 702 that is inserted, and to modify the animation accordingly (e.g., associate different audio streams with different disks 702). The zoetrope 700 may use any method to identify the disk 702, including but not limited to optical scanning unique shapes or patterns of disks, or the like.

Additionally, the zoetrope 700 may be operable to utilize externally supplied signals to control the animation sequence. For example, in one embodiment, a viewer may couple a storage medium (e.g., a CD, a USB storage device, or the like) to the zoetrope 700, and the input interface 116 may use data on the storage medium to control the animation. In this manner, viewers may purchase numerous different interactive animations that may be played on the zoetrope 700.

Although a disk 700 is shown in FIG. 7, it should be appreciated that other structures may be utilized to selectively move a plurality of related images in front of the light assembly 114. For example, the images may be disposed on the walls of a structure that has the shape of a hollow cylinder, such that the light assembly 114 is disposed within the cylinder, and illuminates the images from within the cylinder to form a projection outside of the cylinder. Alternatively, the images may be disposed on a filmstrip that is configured to circulate the images in front of the light assembly at a predetermined rate. Those skilled in the art will readily recognized that other techniques may be used to achieve the desired functionality described above.

In a related embodiment, the light assembly 114 may be a small solid state laser, and the disk 702 may contain a sequence of small diffraction gratings, each encoded with an image 704 for projection. Diffraction gratings may produce a full projected image when even a very small portion of their area is illuminated by a traversing laser beam, thus the disk 702 containing the images may be reduced in diameter such that its radius is the width of the illuminating laser beam. Accordingly, each separate image may take up no more rotational space than the width of the laser beam. In this case, the inventive interactive zoetrope may be miniaturized so that it can fit into a handheld item such as a writing pen. Since images produced with diffraction gratings and lasers have an essentially infinite depth of field, the light emerging from such a handheld zoetrope can be displayed on any convenient surface such as a wall or a ceiling. The handheld pen-like zoetrope projector may (as in the case of previously described embodiments) contain a microphone, to provide instantaneous local interactivity, or may have stored audio or direct animation data so as to provide a "pre-rendered" show.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

We claim:

1. A visual display assembly for creating an interactive three dimensional (3D) animated display for a viewer, comprising:
 a platform supporting a plurality of spaced-apart objects with differing configurations;
 a drive mechanism connected to the platform and operable to rotate the platform about an axis of rotation;
 a light source mounted proximate to the platform;
 an input interface receiving input from the viewer and outputting a viewer input signal; and
 a controller operating the light source to illuminate one of the objects in response to the viewer input signal,
 wherein the objects are positioned at a radius from the rotation axis, wherein the viewer input signal comprises an audio signal, wherein the controller comprises a volume detector detecting a volume level of the audio signal, wherein each of objects is paired with a range of volume levels, and wherein the controller selects the one object to illuminate with the light source from the plurality of objects based upon the determined volume level and the pairing to the determined volume level.

2. The assembly of claim 1, wherein each of the objects comprises a face that is configured to represent the volume level paired with the object.

3. The assembly of claim 1, further comprising an encoder outputting a signal indicative of a position of the platform and wherein the controller operates the light source to illuminate the one object based on the position of the platform and based on the viewer input signal, whereby the controller illuminates differing ones of the objects when the viewer input signal varies over time.

4. The assembly of claim 1, wherein the light source is operated for a time duration selected so as to illuminate only one of the objects per revolution of the platform.

5. The assembly of claim 4, wherein the platform is rotated by the drive mechanism at a rotation rate of at least about 15 revolutions per second and wherein the duration is less than about 300 microseconds.

6. The assembly of claim 1, wherein the input interface receives the input from the viewer over a plurality of revolutions of the platform and wherein the controller operates the light source to illuminate one of the objects in response to the viewer input signal for each of the revolutions of the platform by the drive mechanism, whereby the viewer input signals cause the controller to illuminate differing ones of the objects based on receiving differing ones of the viewer input signals to produce the interactive 3D animated display.

7. The assembly of claim 1, wherein the viewer input signal varies over a time period, wherein the platform is rotated through a plurality of revolutions during the time period, and wherein the controller operates the light source to illuminate at least one of the objects during each of the revolutions, the at least one of the objects being determined by the controller for each of the revolutions based on the varying viewer input signal.

8. A system for animating three-dimensional objects, the system comprising:
an object support supporting a plurality of objects;
a plurality of objects affixed to the object support;
an illumination source operable to selectively illuminate one or more of the plurality of objects;
a control system configured to control at least one of the illumination source and the object support mechanism; and
an input interface that is operable to receive an external signal;
wherein the control system is operable to modify the operation of at least one of the illumination source or object support mechanism dependent upon a characteristic of the external signal, wherein the input interface is configured to receive audio signals, and wherein the characteristic of the external signal is the volume of the signal.

9. The system of claim 8, wherein the illumination source includes a plurality of individual light sources and wherein at least a subset of the individual light sources have features that are independently controllable by the control system.

10. The system of claim 9, wherein the features include color, phase, illumination frequency, or illumination duration.

11. The system of claim 9, further comprising a lens to focus light from the illumination source onto one of the plurality of objects, the one of the plurality of objects selected by the control system based upon the external signal.

12. A method for creating an interactive three dimensional (3D) animated display for a viewer, the method comprising:
rotating a platform supporting a plurality of spaced-apart objects with differing configurations;
receiving an input signal from the viewer; and
controlling the operation of a light source mounted proximate to the platform to illuminate one of the objects in response to the viewer input signal,
wherein the receiving step includes receiving an audio signal, and
wherein the controlling includes detection a volume level of the audio signal and illuminating of the objects dependent upon the detection of the volume level.

13. The method of claim 12, wherein each of the objects comprises a face that is configured to represent a range of the volume level detected.

14. The method of claim 12, further comprising:
receiving from an encoder a signal indicative of a position of the platform;
wherein the controlling step includes illuminating differing ones of the objects based on the position of the platform and the viewer input signal when the viewer input signal varies over time.

15. The method of claim 12, wherein the platform is rotated at a rotation rate of at least about 15 revolutions per second, and wherein the light source is operated for a time duration of less than about 300 microseconds, so as to illuminate only one of the objects per revolution of the platform.

16. The method of claim 12, wherein the receiving step includes receiving the input signal from the viewer over a plurality of revolutions of the platform, and wherein the controlling step includes operating the light source to illuminate one of the objects in response to the viewer input signal for each of the revolutions of the platform, whereby differing ones of the objects are illuminated based on receiving differing ones of the viewer input signals to produce the interactive 3D animated display.

17. The method of claim 12, wherein the receiving step includes receiving a viewer input signal that varies over a time period, wherein the rotating step includes rotating the platform through a plurality of revolutions during the time period, and wherein the controlling step includes operating the light source to illuminate at least one of the objects during each of the revolutions, the at least one of the objects being determined for each of the revolutions based on the varying viewer input signal.

18. A system for animating objects, comprising:
a plurality of objects;
an illumination source operable to selectively illuminate one or more of the plurality of objects;
a control system configured to control at least one of the illumination source and the position of the plurality of the objects relative to the illumination source; and
an input interface that is operable to receive an signal;
wherein the control system is operable to modify at least one of the operation of the illumination source and the position of the plurality of objects relative to the illumination source dependent upon a characteristic of the signal,
wherein the signal is an audio signal, and
wherein the characteristic is a volume level of the audio signal.

19. The system of claim 18, wherein the plurality of objects comprise three dimensional objects.

20. The system of claim 18, wherein the plurality of objects comprise image elements.

21. The system of claim 20, wherein the image elements are formed on an at least partially light transmissive portion of a base, and wherein light from the illumination source is selectively passed through the image elements to form a plurality of projected images.

22. The system of claim 21, further comprising:
a projection surface that is operable to receive light from the illumination source such that a viewer may observe the plurality of projected images.

23. The system of claim 18, wherein the input interface is operable to receive the signal from a source internal to the system.

24. The system of claim 23, further comprising:
a storage medium that is operable to store an audio file that is usable to generate the signal.

25. The system of claim 18, wherein the input interface is operable to receive the signal from an external source.

* * * * *

UNITED STATES PATENT AND TRADEMARK OFFICE
CERTIFICATE OF CORRECTION

| | | |
|---|---|---|
| PATENT NO. | : 7,940,370 B2 | Page 1 of 1 |
| APPLICATION NO. | : 12/202667 | |
| DATED | : May 10, 2011 | |
| INVENTOR(S) | : David F. Barnett et al. | |

It is certified that error appears in the above-identified patent and that said Letters Patent is hereby corrected as shown below:

At Col. 5, line 53, delete "shalt" and insert therefor --shaft--.
At Col. 7, line 26, delete "singe" and insert therefor --single--.
At Col. 14, line 3, delete "detection" and insert therefor --detecting--.

Signed and Sealed this
Fourteenth Day of June, 2011

David J. Kappos
*Director of the United States Patent and Trademark Office*